United States Patent [19]

Tentler

[11] Patent Number: 4,471,389
[45] Date of Patent: Sep. 11, 1984

[54] INTERFERENCE PULSE ELIMINATION IN CAPACITANCE ELECTRONIC DISC SYSTEMS

[75] Inventor: Michael Tentler, Prospect Heights, Ill.

[73] Assignee: Zenith Electronics Corporation, Glenview, Ill.

[21] Appl. No.: 353,560

[22] Filed: Mar. 1, 1982

[51] Int. Cl.$^3$ ............................................. H04N 5/76
[52] U.S. Cl. .................................. 358/336; 358/342; 369/126
[58] Field of Search ............... 360/38.1; 358/314, 336, 358/160, 167, 188, 342, 340; 369/126, 175; 455/303

[56] References Cited

U.S. PATENT DOCUMENTS

| 4,327,431 | 4/1982 | Dieterich et al. | 369/126 |
| 4,327,432 | 4/1982 | Lang et al. | 369/126 |
| 4,361,881 | 11/1982 | Clemens | 358/336 |
| 4,364,119 | 12/1982 | Gibson | 358/336 |
| 4,385,374 | 5/1983 | Kelleher | 358/336 |

OTHER PUBLICATIONS

Schematic Diagram, Prior Art, RCA Company Private Restricted Data; Dwg. No. 2843022, Pulse Interference Corrector.
SFT100 Player Technical Manual, RCA Corporation; Selected Tutorial pp. 9, 10, 11, 12, 13, 14; 29, 30, 31, 32; 39, 40, 43, 44, 45, 46, 47, 48.

Primary Examiner—Raymond F. Cardillo, Jr.
Attorney, Agent, or Firm—Cornelius J. O'Connor

[57] ABSTRACT

A pulse interference detector is disclosed for use in a capacitance electronic disc player (CED). A relatively short-duration, high-amplitude periodic interference pulse, such as a radar pulse, is detected. The video carrier signal of the CED has a first envelope aberration in the form of a relatively long peak-to-peak duration amplitude modulation component, and a second envelope aberration in the form of the interference pulse. The CED incudes a defect corrector for inserting, when triggered, preceding unblemished display line information into a current display line void. The pulse interference detector receives and processes the video carrier signal and also detects the interfering radar pulse. The detector comprises a first signal path responsive only to the amplitude modulation component, and includes a resistor-capacitor network for producing a reference component substantially representing an average of the envelope excursion of the component. A second signal path is responsive only to the interference signal, and includes a transistor for triggering the defect corrector upon occurence of the interference pulse. A threshold of triggering response is established outside the maximum excursion of the envelope formed by the amplitude modulation component of the video carrier signal.

2 Claims, 3 Drawing Figures

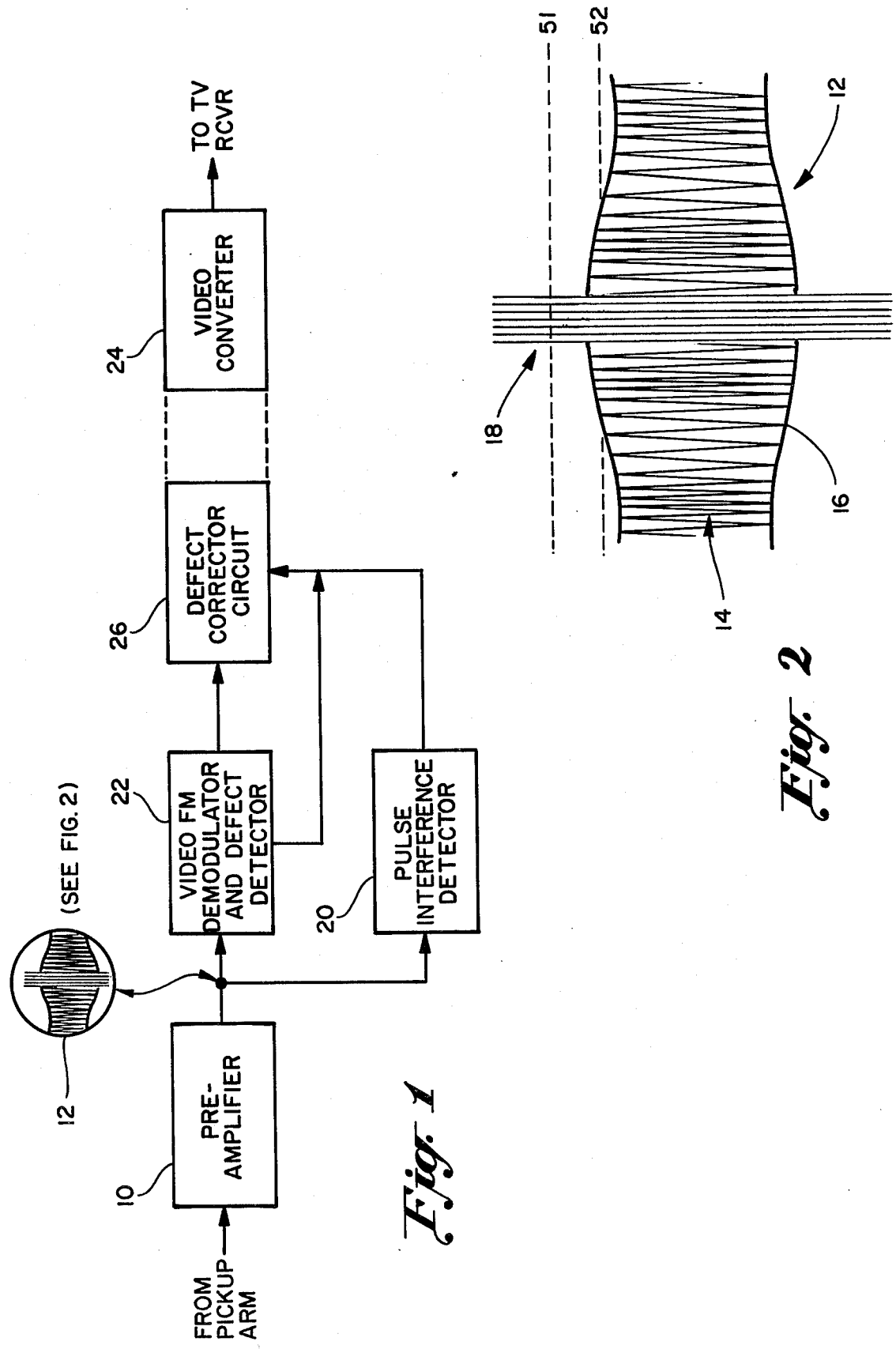

INTERFERENCE PULSE ELIMINATION IN CAPACITANCE ELECTRONIC DISC SYSTEMS

BACKGROUND OF THE INVENTION

This invention is related to video disc systems, and is particularly concerned with improving the performance and reliability of a CED (capacitance electronic disc) system.

In the CED system, the video and audio information is embodied in a spirally grooved disc. Playback is by a pick-up stylus similar to the stylus of an audio record player; however, the information density is much greater in the CED as there are forty grooves in the video disc system for every one in an audio system. The video information on the capacitance electronic disc is in the form of successive dimensionally varying information track elements in the bottom of each groove. These elements induce a varying capacitance between a metallized electrode on the pickup stylus tip, which serves as one plate of a capacitor, and the disc, which serves as the other plate. The signal on the disc is in the form of frequency modulated video and audio carriers. The elements very minutely; e.g., in the order of Angstrom units, specifically, about 800 Å peak-to-peak. Hence the variance in capacitance provided is also very small, with a capacitance change of about $10^{-4}$ picofarad.

The signal induced by this very small capacitance is coupled to a 910 MHz tuned line which is driven by a 915 MHz oscillator, resulting in amplitude modulation of the 915 MHz signal. An amplitude detector circuit provides an FM carrier output signal of five to ten millivolts peak to peak. The signal spectrum of the video disc comprises an audio carrier at 716 kHz and a video FM carrier with side bands from 2 to 9.3 MHz.

The CED system also includes means to detect and correct defects in the signal. When the defect detector is activated, a corresponding portion of the previous horizontal line of information is inserted into the area of the defect. By this process, momentary defects in the video carrier are not displayed; instead, the corresponding part of the previous horizontal line is displayed. As many as three horizontal lines can be inserted by the defect corrector before there is any noticeable degradation in the television picture.

The CED system is immune to normal sources of interference such as the local oscillator signals of nearby radio and television sets, citizen's band and general communication signals, and RFI from nearby appliances. However, the very small signal output, coupled with the fact that the tuned line operates at a frequency of 915 MHz (within the "garbage" band), make this CED system vulnerable to an unusual source of radio frequency interference. This interference originates in a radar set in general use. The radar set emits high power pulses at the rate of several hundred per second in the frequency band of interest, at a scan rate of six or twelve revolutions per minute. The pulses are detected by the CED system and appear as superimposed on the envelope of the 5 MHz signal which carries the video information. The pulses are clearly visible in the television picture.

High-density capacitive information records and playback apparatus therefore is disclosed in U.S. Pat. No. 3,783,196 to Stanley.

A circuit is known which responds to radio-frequency interference of the type originating from the aforedescribed radar set. This relatively complex circuit utilizes an integrated circuit synchronous detector for detecting short duration noise pulses on the envelope of a video FM carrier. Upon receipt of such pulses, a transistor switch closes to activate a substitution system which blanks that portion of the raster line that would otherwise display the noise pulse, and interjects the corresponding part of the previous line. The circuit also includes means for suppressing sync pulses that appear on the envelope of the video FM carrier. The relative complexity of the circuit, and the large number of components render it undesirably slow in response time, and relatively expensive to manufacture.

OBJECTS OF THE INVENTION

It is a general object of this invention to provide for enhanced performance and reliability of a CED (capacitance electronic disc) player.

It is a less general object of the invention to provide for CED immunity to an uncommon interfering signal.

It is a more specific object of this invention to provide for CED immunity to a high power pulse signal lying in the 900 to 960 MHz range.

It is a specific object of the invention to provide an interference pulse detector system having a response time measured in fractions of a microsecond.

BRIEF DESCRIPTION OF THE DRAWINGS

The features of the present invention which are believed to be novel are set forth with particularity in the appended claims. The invention, together with objects and advantages thereof, may be best understood, however, by reference to the following description taken in conjunction with the accompanying drawings, in the several figures of which like reference numerals identify like elements, and in which:

FIG. 1 is a block diagram depicting schematically the elements of the capacitance electronic disc player in relation to the pulse interference detector means according to the invention;

FIG. 2 indicates diagramatically a frequency modulated waveform having an interference pulse superimposed on its envelope; and, FIG. 3 is an electrical schematic diagram of the pulse interference detector according to the invention.

DESCRIPTION OF THE PREFERRED EMBODIMENT

Figure 3:
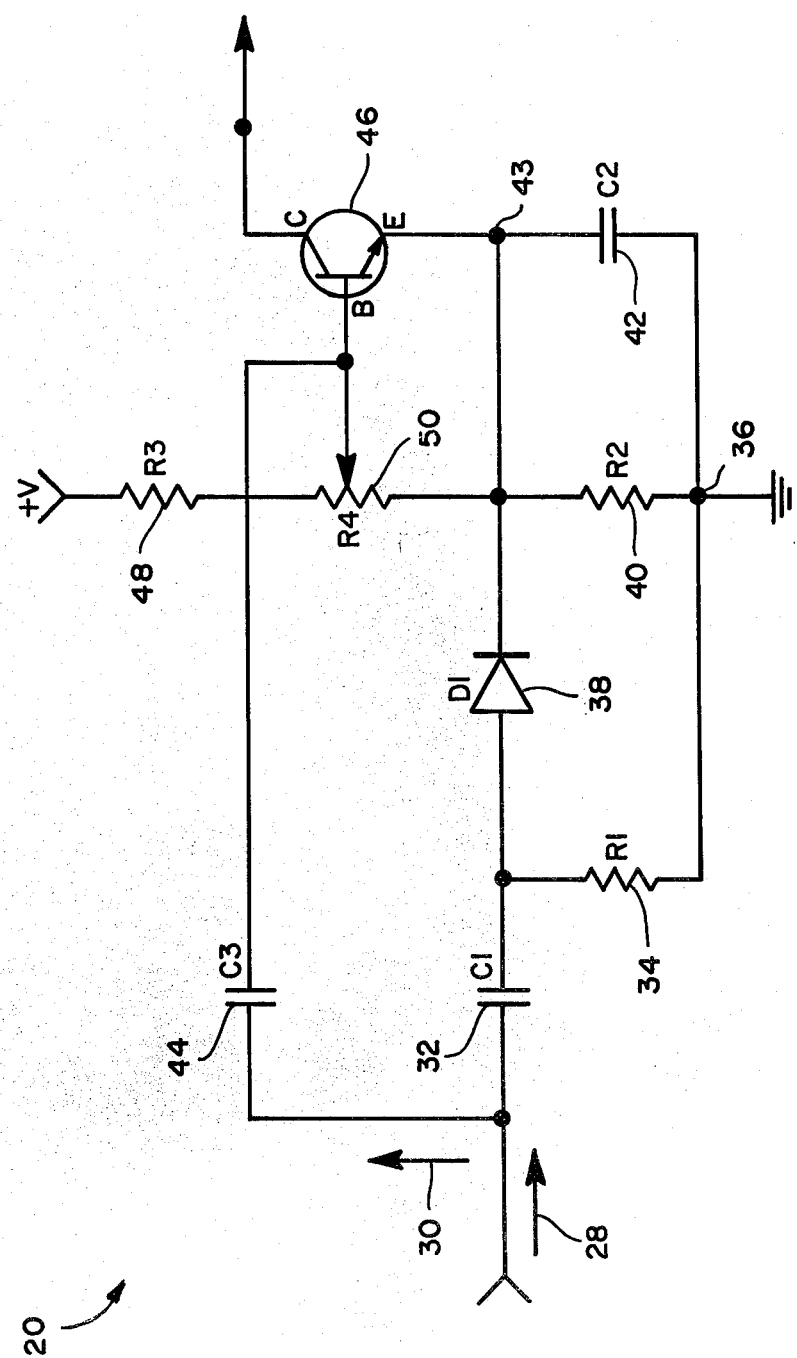

The pulse interference detector according to the invention, and the major CED circuits with which it is associated, is shown schematically by the block diagram, FIG. 1, and described in greatly simplified terms in the following paragraphs.

A composite FM signal from the pickup arm is amplified by the preamplifier 10, which includes a two-stage transistor amplifier. The nominal 10 millivolt peak-to-peak signal from the pickup arm is amplified to about 1,000 millivolts by the preamplifier 10. The output of preamplifier 10 comprises a waveform 12 which is a frequency-modulated signal that carries the video information. This signal, which is shown more explicitly in FIG. 2, is designated as the video carrier signal.

The video carrier signal 12 has a first envelope aberration in the form of a relatively long peak-to-peak duration amplitude modulation component 16. A second envelope aberration is in the form of a relatively short-duration, high-amplitude periodic interference pulse, which may be by way of example a radar pulse emitted by a high-power radar set described heretofore which is operating in the vicinity of the CED. Pulse 18 is depicted as being superimposed on amplitude modulation component 16. It is this pulse 18 which the pulse interference detector according to the invention is dedicated to detecting and nullifying. The video carrier signal 12 also includes an undesired direct-current component (not indicated).

The pulse interference detector 20 is shown schematically in FIG. 1 as being in parallel with a video FM demodulator stage 22. The video FM demodulator, in addition to demodulating the FM component, includes a limiter circuit for amplitude-limiting the video-carrier signal. A video converter 24 accepts the demodulated signal from the video FM demodulator 22 and converts it to a standard television signal as defined by the National Television Standards Committee. The standard television signal in turn is used to modulate an rf carrier having a frequency corresponding to channel 3 or 4 of a television receiver.

The video FM demodulator 22 is indicated as including a defect detector means for the detection of defects that may occur during the scanning of each horizontal line, and which degrade picture quality. Defects consist of drop-outs or "voids" in which the video carrier information is missing (caused by loss of the video carrier, for example). The defect corrector 26 consists essentially of two parts—an electronic single-pole, double-throw switch, and a delay line (not shown). The center pole of the switch is connected to the video converter 24. A normally closed contact of the switch is connected to the video FM demodulator 22 to receive the demodulated video carrier signal. The other, normally open contact of the switch is connected to a 1H delay line which stores the horizontal line of information occurring before the line exhibiting the defect. The 1H delay line is a charge-coupled device having the necessary wide bandwidth for accepting the video information. When a defect occurs, a signal from the defect detector in the video FM demodulator 22 causes the switch to move to the normally open contact. As a result, the preceding display line information is inserted, when the defect corrector is triggered into a current display line void, which may comprise a part of a line or an entire line.

The pulse interference detector 20 according to the claimed invention is shown schematically in FIG. 3. The preferred value for designated ones of the components, or the recommended component type, is provided in parentheses following the reference number.

Pulse interference detector 20 comprises means for receiving and processing video carrier signal 12 for detecting an interfering radar pulse. Detector 20 has a first signal path 28 and a second signal path 30, as indicated by the associated arrows. First signal path 28 is responsive only to amplitude modulation component 16 of the video carrier signal 12, and has means for producing a reference component substantially representing an average of the envelope excursion of the amplitude modulation component 16. First signal path 28 includes a first capacitor 32 (0.01 mf) for blocking the aforedescribed direct-current component. Detector means following first capacitor 32 serves to develop a demodulated signal representing the amplitude modulation component 16. The detector means includes a first resistor 34 (1 k) connected between a grounding point 36 and one terminal of capacitor 32, and the series-combination of a diode 38 (type 1N914) and a second resistor 40 (620 ohms) connected in parallel with capacitor 42 to the grounding point 36.

First signal path 28 includes network means for responding only to the relatively long peak-to-peak amplitude modulation component. The network means consists of second resistor 40 in parallel with a relatively large value second capacitor 42 (2.2 mf) for producing at a reference point 43 a reference dc voltage substantially representing the average voltage of the envelope excursion of the amplitude modulation component 16. As a result of the relatively long time constant of the resistor-capacitor 40–42 network, the reference voltage at point 43 is relatively constant and represents a steady-state average of the slowly varying voltage of the amplitude modulation component 16.

Second signal path 30 is responsive only to the interference signal 18. The second path includes electronic triggerfing means for triggering the defect corrector upon receipt of an interference pulse 18. The triggering occurs when the interference pulse is above the threshold 51 established by the adjustment of potentiometer 50. Thus, a threshold 51 is established which is outside the maximum excursion of the amplitude modulation component of video carrier signal 12.

Second signal path 30 includes a third capacitor 44 (0.001 mf) series-connected in the path for blocking the undesired direct-current component. The aforementioned electronic triggering means preferably comprises a transistor 46 having a base B, an emmitter E, and a collector C. The base B is connected to one electrode of third capacitor 44, the emitter E is connected to reference point 43, and, the collector C is coupled to defect corrector 26 for the purpose of triggering defect corrector 26 by, in effect, grounding the defect corrector 26 through second resistor 40.

Second signal path 30 also has means for biasing transistor 46, which means comprises a third resistor 48 (860 k) and a potentiometer 50 (100 k) series-connected between a source of positive voltage and reference point 43. The center-tap of potentiometer 50 is connected to base B of transistor 46 to provide an adjustable bias on the base B of transistor 46 for establishing a bias at which the threshold level of triggering response is safely outside the maximum excursion of the envelope of the amplitude modulation component 16 of the video carrier signal 12. With reference to FIG. 2, the threshold level 51 is indicated with respect to the dc voltage reference level at reference point 43, noted as being a relatively steady-state average 52 of the varying voltage of the amplitude modulated envelope of video carrier signal 12.

According to the invention, the electronic triggering means represented by transistor 46 in the preferred embodiment of the invention can be adjusted so that the pulse interference detector is non-responsive to the maximum excursion of the amplitude modulation component 16, yet is responsive to the interference of the radar pulse superimposed on the amplitude modulation component 16 for the duration of the pulse.

A major benefit of the pulse interference detector according to the invention is its very fast response time which, when the proper transistor is used, is of the order of fractions of a microsecond. A preferred transistor type is Motorola MPS 6514, or an equivalent. Response time is aided by virtue of the fact that there are relatively few components in either signal path so transit-time delay is minimal. As a result, interfering pulses of the radar type herein considered are rendered imperceptible in the picture display.

Although the invention has been described in terms of a preferred embodiment, it will be apparent to those skilled in the art that modifications and alterations may be made without departing from the invention in its broader aspects. Accordingly, it is intended that all such modifications and alterations be considered as within the spirit and scope of the invention as defined by the appended claims.

I claim:

1. A pulse interference detector for use in a capacitance electronic disc player for detecting an interfering radar pulse, said player having a preamplifier for amplifying a frequency modulated video carrier signal produced in the pickup arm of said player, said video carrier signal having a first envelope aberration in the form of a relatively long peak-to-peak duration amplitude modulation component, and a second envelope aberration in the form of said radar pulse superimposed on said amplitude modulation component, said video carrier also including an undesired direct-current component resulting from the narrow bandwidth response of said preamplifier, said player having defect corrector means for inserting, when triggered, preceding display line information into a current display line void, said pulse interference detector comprising means for receiving and processing said video carrier for detecting said radar pulse, said means comprising:

first signal path means having capacitance means for blocking said undesired direct current component, and including detection means for demodulating said amplitude modulation component, and having a relatively large value paralleled resistor-capacitor network for responding only to said amplitude modulation component for producing a reference voltage substantially representing the average voltage level of said amplitude modulation component;

second signal path means having capacitance means for blocking said undesired direct-current component, and including transistor switching means responsive to said radar pulse for triggering said defect detector means, said second path further including means for receiving said reference voltage for biasing said transistor switching means for response at a voltage threshold only outside the maximum excursion of the envelope of said amplitude modulation component;

such that said pulse interference detector is non-responsive to said amplitude modulation component of said video carrier signal, yet is responsive to said radar signal superimposed on said component for switching on said defect corrector means for the duration of said radar pulse.

2. A pulse interference detector for use in a capacitance electronic disc player for detecting an interfering radar pulse, said player having a preamplifier for amplifying a frequency modulated video carrier signal produced in the pickup arm of said player, said video carrier signal having a first envelope aberration in the form of a relatively long peak-to-peak duration amplitude modulation component, and a second envelope aberration in the form of said radar pulse superimosed on said amplitude modulation component, said video carrier signal also including an undesired direct-current component resulting from the narrow bandwidth response of said preamplifier, said player having defect corrector means for inserting, when triggered, preceding unblemished display line information into a current display line void, said pulse interference detector comprising means for receiving and processing said video carrier signal for detecting said radar pulse, said means having first and second signal path means, said first signal path means including:

first capacitance means series-connected in said path for blocking said undesired direct current component;

detector means following said capacitance means for developing a demodulated signal representing said amplitude modulation component, said detector means including a first resistor connected to a grounding point, and a diode and series-connected second resistor connected in parallel with said first resistor;

network means for responding only to said relatively long, peak-to-peak duration amplitude modulation component, said network means consisting of said second resistor in parallel with a relatively large-value capacitor for producing at a reference point a reference voltage substantially representing the average voltage of said amplitude modulation component; said second signal path including:

third capacitor means series-connected in said path for blocking said undesired direct-current component;

a transistor having a base, an emitter and a collector, said base being connected to said third capacitor, said emitter to said reference point, and said collector to said defect corrector means for triggering said defect corrector by grounding said corrector;

means for biasing said transistor including a third resistor and a potentiometer series-connected between a source of voltage and said reference point, the center tap of said potentiometer being connected to said base for adjustment of said bias of said transistor;

such that the bias of said transistor can be adjusted so that said pulse interference detector is non-responsive to the maximum excursions of said amplitude modulation component, yet is responsive to said radar pulse for triggering said defect corrector means for the duration of said pulse.

* * * * *